United States Patent
Oda

(10) Patent No.: US 10,663,268 B2
(45) Date of Patent: May 26, 2020

(54) IGNITER ASSEMBLY FOR GAS GENERATOR AND MANUFACTURING METHOD THEREOF

(71) Applicant: DAICEL CORPORATION, Osaka-shi, Osaka (JP)

(72) Inventor: Shingo Oda, Osaka (JP)

(73) Assignee: DAICEL CORPORATION, Osaka-Shi (JP)

( * ) Notice: Subject to any disclaimer, the term of this patent is extended or adjusted under 35 U.S.C. 154(b) by 0 days.

(21) Appl. No.: 16/345,022

(22) PCT Filed: Oct. 17, 2017

(86) PCT No.: PCT/JP2017/037504
§ 371 (c)(1),
(2) Date: Apr. 25, 2019

(87) PCT Pub. No.: WO2018/100905
PCT Pub. Date: Jun. 7, 2018

(65) Prior Publication Data
US 2019/0293394 A1    Sep. 26, 2019

(30) Foreign Application Priority Data
Nov. 29, 2016    (JP) ................... 2016-231635

(51) Int. Cl.
*F42B 3/14*    (2006.01)
*B60R 21/264*    (2006.01)
(Continued)

(52) U.S. Cl.
CPC ............... *F42B 3/14* (2013.01); *B60R 21/26* (2013.01); *B60R 21/264* (2013.01); *F42B 3/12* (2013.01);
(Continued)

(58) Field of Classification Search
CPC .... F42B 3/14; F42B 3/12; F42B 3/182; B60R 21/26; B60R 21/264; B60R 2021/26029
(Continued)

(56) References Cited

U.S. PATENT DOCUMENTS 5,241,910 A * 9/1993 Cunningham ...... B60R 21/2644
102/202.2
6,257,910 B1 * 7/2001 Mramor ................. F42B 3/182
200/51.1
(Continued)

FOREIGN PATENT DOCUMENTS

DE    10228052399 A1 *    4/2010    ............. B60R 21/01
DE    102008052399 A1    4/2010

OTHER PUBLICATIONS

English translation of the International Preliminary Report on Patentability and Written Opinion of the International Searching Authority for International Application No. PCT/JP2017/037504, dated Jun. 4, 2019.

*Primary Examiner* — Samir Abdosh
(74) *Attorney, Agent, or Firm* — Birch, Stewart, Kolasch & Birch, LLP.

(57) ABSTRACT

The present invention provides an igniter assembly in which an igniter having an ignition portion and an electroconductive pin, and a metallic igniter retaining member are integrated with a resin molded article interposed therebetween, the igniter assembly, including:

a connector insertion space formed by the resin molded article, the electroconductive pin being protruding from the resin molded article and located in the connector insertion space;

a spark member including, a first end connected to the metallic igniter retaining member, and (Continued)

a second end, opposite to the first end, located inside the connector insertion space; and
an electrically insulating partition wall having a thickness of 0.1 mm to 1 mm, provided with no through hole, and interposed between a root portion of the electroconductive pin, which is in contact with the resin molded article, and the second end of the spark member.

18 Claims, 5 Drawing Sheets

(51) Int. Cl.
  *B60R 21/26* (2011.01)
  *F42B 3/12* (2006.01)
  *F42B 3/182* (2006.01)
(52) U.S. Cl.
  CPC .... *F42B 3/182* (2013.01); *B60R 2021/26029* (2013.01)
(58) Field of Classification Search
  USPC .............................. 102/202.5, 202.8, 202.9
  See application file for complete search history.

(56) References Cited

U.S. PATENT DOCUMENTS

| | | |
|---|---|---|
| 6,446,557 B1 | 9/2002 | Lübbers |
| 9,688,235 B2 * | 6/2017 | Yamauchi ............... F42B 3/121 |
| 2013/0255528 A1 * | 10/2013 | Ozaki ...................... F42B 3/04 |
| | | 102/530 |
| 2016/0052481 A1 * | 2/2016 | Yamauchi ............... F42B 3/121 |
| | | 102/530 |

* cited by examiner

[Fig. 1]
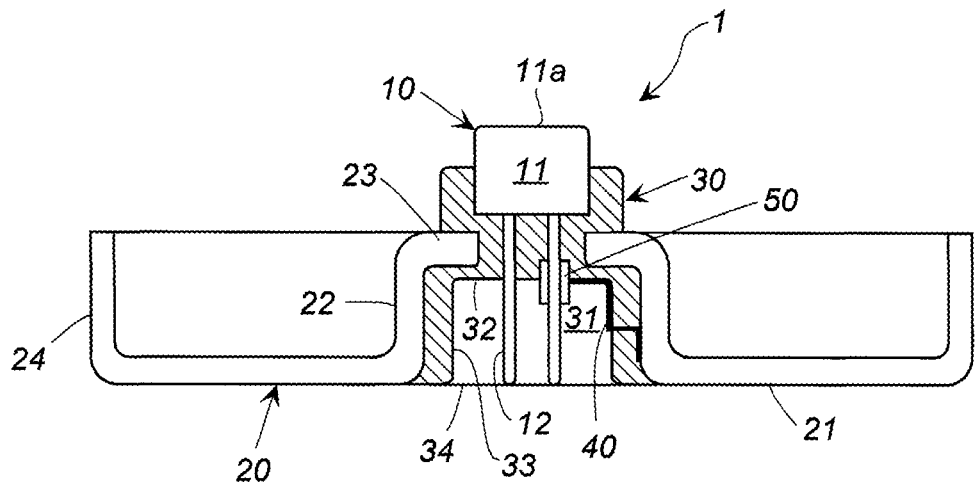
[Fig. 2]
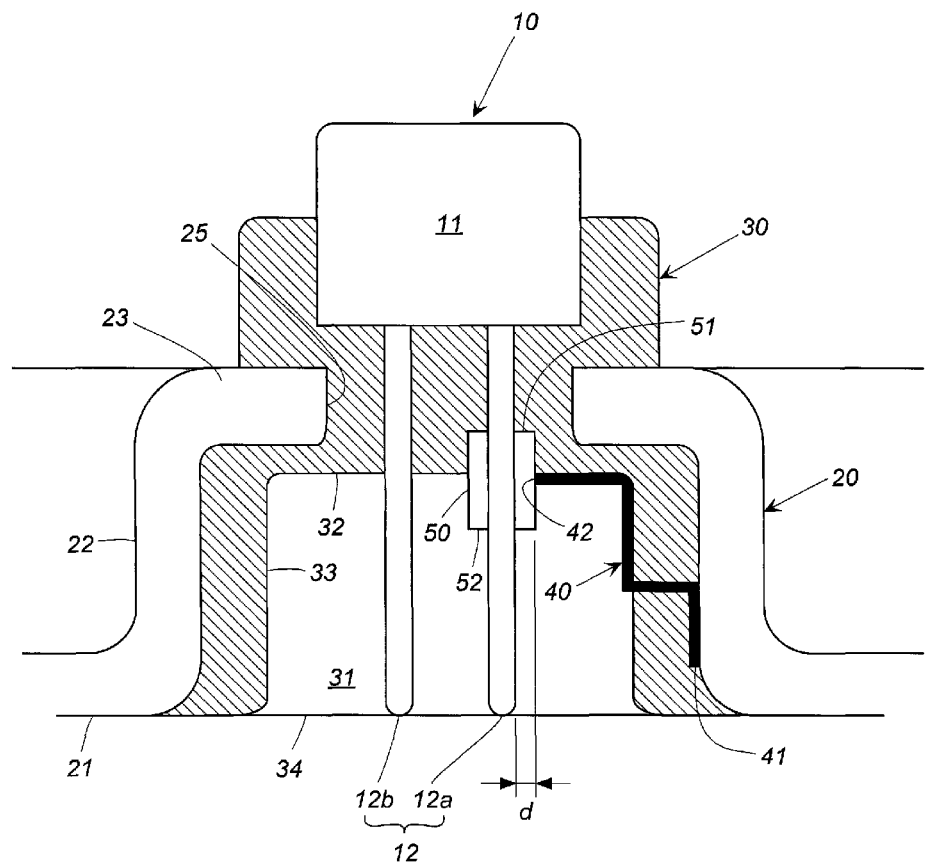

[Fig. 3]
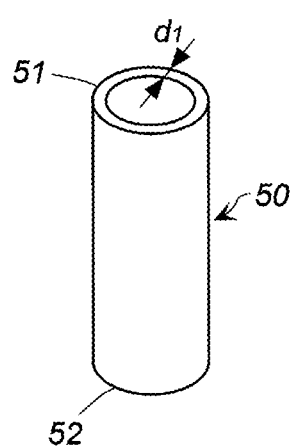 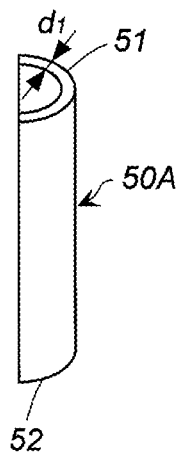 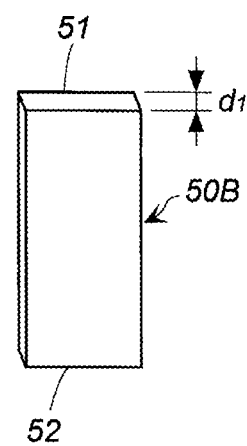
(a)　　　　　(b)　　　　　(c)
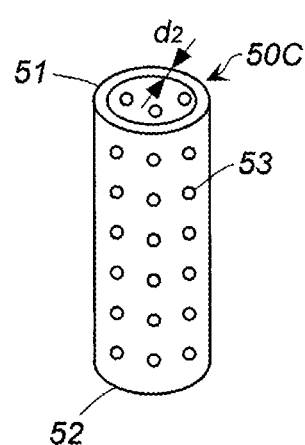 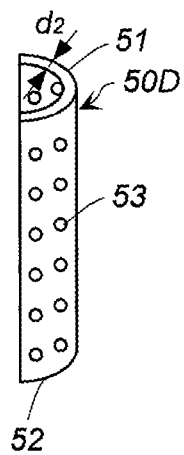 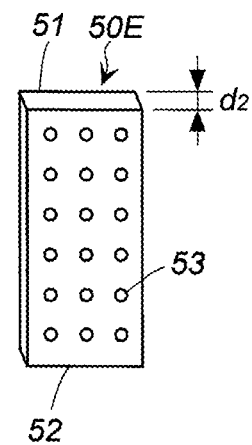
(d)　　　　　(e)　　　　　(f)

[Fig. 4]
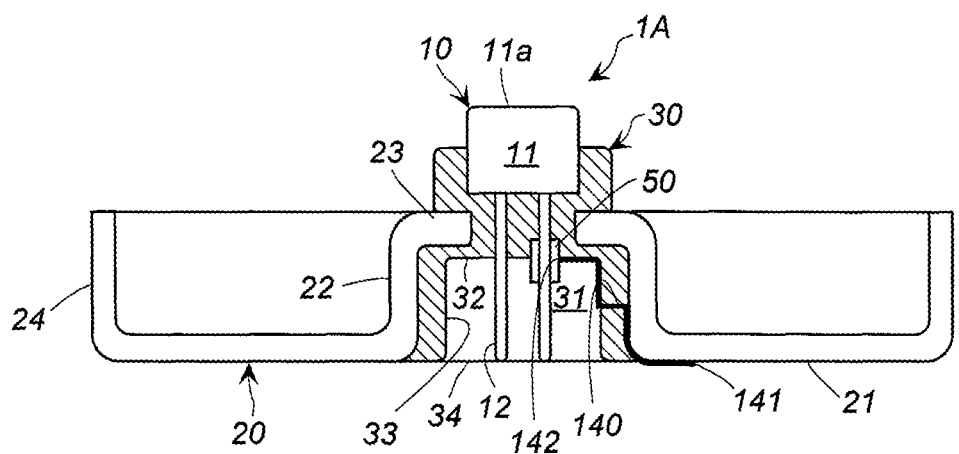
[Fig. 5]
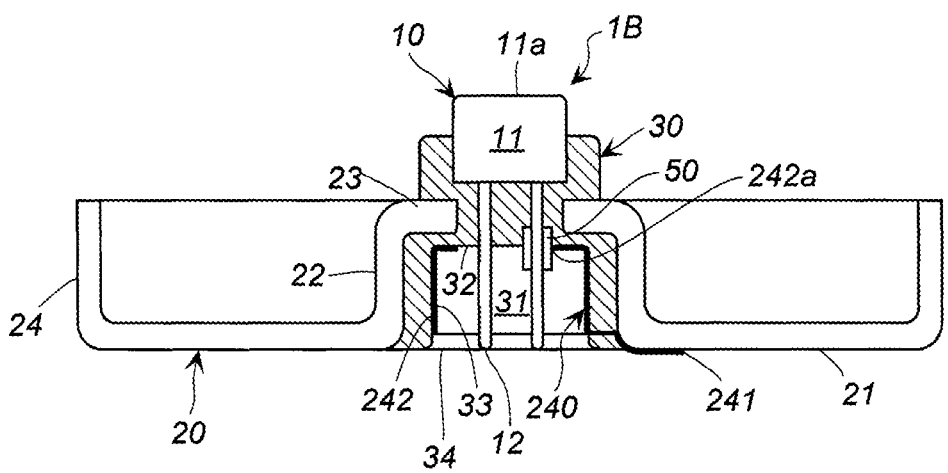

[Fig. 6]
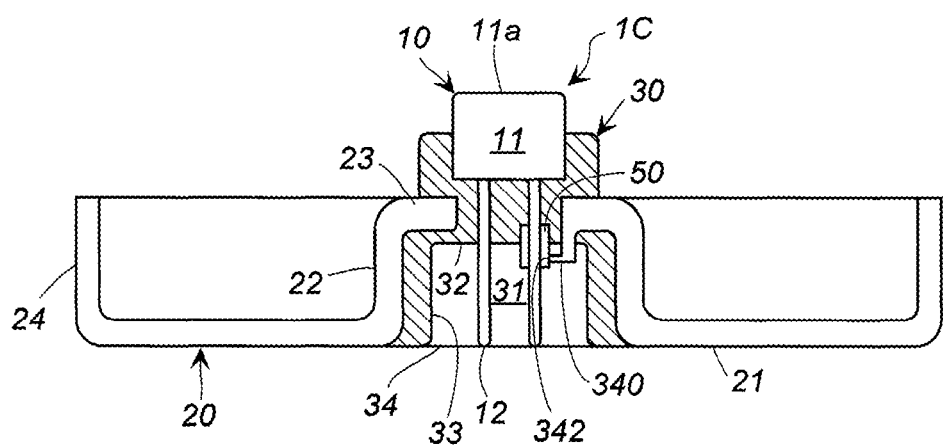
[Fig. 7]
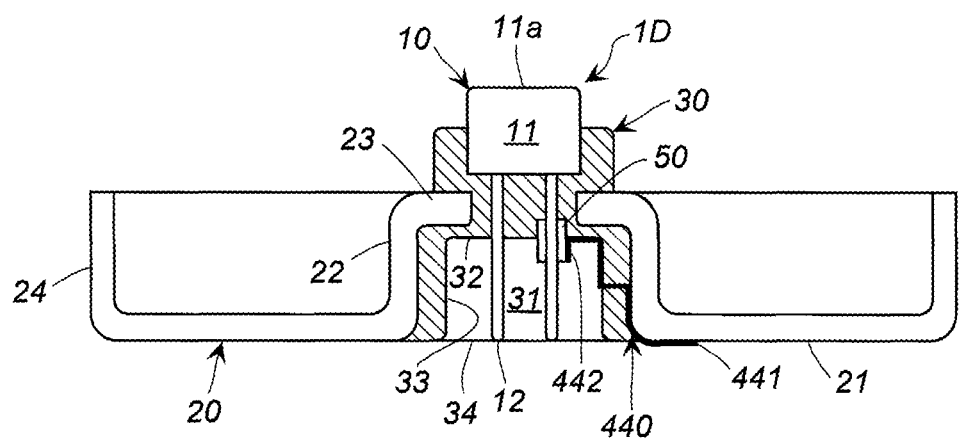

[Fig. 8]
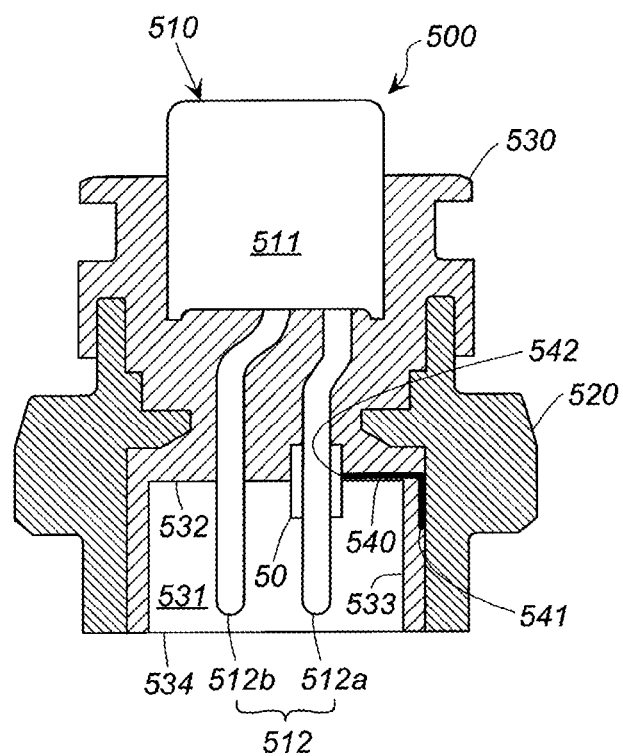

IGNITER ASSEMBLY FOR GAS GENERATOR AND MANUFACTURING METHOD THEREOF

TECHNICAL FIELD

The present invention relates to a gas generator usable for an airbag apparatus to be installed in a vehicle, an igniter assembly used in the gas generator, and a manufacturing method of the igniter assembly.

DESCRIPTION OF THE RELATED ART

In a gas generator, in order to ensure resistance against pressure and heat at the time of actuation, a solid gas generating agent, an igniter for igniting the solid gas generating agent, and the like are accommodated in a metal housing and mounted in such a state in a module case.

Conventionally, the metal housing of the gas generator is connected to a metal part of the module case, and the module case is then connected to a metal part of a vehicle body. Therefore, even when electricity (electric charge) is accumulated in the metal housing (in the case of being charged), the electric charge is discharged to the vehicle body, so that an untimely ignition (unexpected ignition due to malfunction) does not occur due to a discharge phenomenon.

However, in recent years, a damper formed of rubber or the like is disposed between the module case and the gas generator housing, or a part of the module case is formed of a resin in order to prevent a steering wheel from resonating due to vibration of an engine. For this reason, the metal housing of the gas generator is electrically insulated from the outside, and the electric charge accumulated in the housing is not discharged, which may cause an untimely ignition of the gas generator.

DE 102008052399 A discloses an invention relating to a gas generator in which the electric charge accumulated in a housing is discharged.

A protruding portion 16 is formed in the center portion of a housing 12 of a gas generator, and an igniter 20 is fixed to the protruding portion 16 by an injected resin 24. An electroconductive pin 22 extends from the igniter 20 and an overvoltage protection element 28 is attached to the injected resin 24. One end 32 of the overvoltage protection element 28 forms a gap d with respect to the electroconductive pin 22 and has a function of skipping a spark in the gap d when the charging voltage of the housing rises due to static electricity or the like.

SUMMARY OF THE INVENTION

The first aspect of the present invention (hereinafter referred to as the "first aspect") provides an igniter assembly in which an igniter having an ignition portion and an electroconductive pin, and a metallic igniter retaining member are integrated with a resin molded article interposed therebetween, the igniter assembly, including:

a connector insertion space formed by the resin molded article, and the electroconductive pin being protruding from the resin molded article and located in the connector insertion space;

a spark member including,
a first end connected to the metallic igniter retaining member, and
a second end, opposite to the first end, located inside the connector insertion space; and an electrically insulating partition wall having a thickness of 0.1 mm to 1 mm, provided with no through hole, and interposed between a root portion of the electroconductive pin, which is in contact with the resin molded article, and the second end of the spark member.

The second aspect of the present invention (hereinafter referred to as the "second aspect") provides an igniter assembly in which an igniter having an ignition portion and an electroconductive pin, and a metallic igniter retaining member are integrated with a resin molded article interposed therebetween, the igniter assembly, including:

a connector insertion space formed by the resin molded article, the electroconductive pin being protruding from the resin molded article and located in the connector insertion space;

a spark member including,
a first end connected to the metallic igniter retaining member, and
a second end, opposite to the first end, located inside the connector insertion space; and an electrically insulating partition wall having a thickness of 0.1 mm to 2 mm, provided with a through hole, and interposed between a root portion of the electroconductive pin, which is in contact with the resin molded article, and the second end of the spark member, and the second end and the through hole facing each other.

The present invention further provides a method for manufacturing the igniter assembly.

BRIEF DESCRIPTION OF THE DRAWINGS

The present invention will become more fully understood from the detailed description given hereinbelow and the accompanying drawings which are given by way of illustration only, and thus are no limitative of the present invention and wherein:

FIG. 1 shows an axial sectional view of an igniter assembly of the present invention;

FIG. 2 shows a partial enlarged view of the igniter assembly shown in FIG. 1;

FIG. 3 shows, in (a) to (f), perspective views of electrically insulating partition walls of different embodiments;

FIG. 4 shows an axial sectional view of an igniter assembly of another embodiment of the present invention;

FIG. 5 shows an axial sectional view of an igniter assembly of yet another embodiment of the present invention;

FIG. 6 shows an axial sectional view of an igniter assembly of yet another embodiment of the present invention;

FIG. 7 shows an axial sectional view of an igniter assembly of yet another embodiment of the present invention; and FIG. 8 shows an axial sectional view of an igniter assembly of yet another embodiment of the present invention.

DETAILED DESCRIPTION OF INVENTION

In the gas generator of DE 102008052399 A, the case where the overvoltage protection element 28 and the injected resin 24 are fixed integrally at the time of injection molding is preferable from the viewpoint of facilitating manufacture, but the gap d easily changes depending on an injection pressure of the resin, and there is a high possibility that the spark will not appear in the gap d under a designed voltage. Therefore, it is necessary to strictly control a size of the gap d, but it is technically difficult to form the gap d with an air gap having a constant width at all times in view of the processing tolerance of the overvoltage protection element. It is also conceivable that, after mounted on a vehicle as a finished product, the width d of the gap may be slightly changed due to vibrations of a running vehicle for many years. In addition, it is also conceivable that the interval d may be changed due to impacts applied when inserting or detaching a connector at the time of repair.

In particular, in DE 102008052399 A, it is already known that sparks skip when the charging voltage is 10 kV or less, and in order that sparks skip at a voltage of this value, according to U.S. Pat. No. 6,446,557 B (in Column 4, Lines 62 to 64), the gap F corresponding to the gap d is 0.1 mm to 0.9 mm. In view of the above, with the invention of DE 102008052399 A, it is difficult to mass-produce the igniter assembly with strict control of the gap d.

The present invention provides an igniter assembly capable of preventing an igniter from malfunctioning by spontaneously discharging a charge created by accumulated static electricity, and a manufacturing method thereof.

When the igniter assembly and the gas generator including the igniter assembly are used in an airbag apparatus in a vehicle or the like, it is desirable to prevent the igniter from malfunctioning due to static electricity accumulated in the igniter.

In the igniter assembly of the first aspect, when the static electricity accumulates and reaches a certain voltage (for example, 3 kV to 5 kV), the voltage is lowered by air discharge, thereby preventing occurrence of the abovementioned malfunction. This is based on a technical idea different from that of, for example, an invention using ground.

In the igniter assembly of the first aspect, an electrically insulating partition wall having a thickness of 0.1 mm to 1 mm is interposed between the electroconductive pin and an end (a second end) of the spark member. The electrically insulating partition wall is a partition wall made of an electrically insulating material.

The metallic igniter retaining member may be, for example, an igniter collar such as shown by the reference numeral 41 in FIG. 1 of JP 4266344 B (U.S. Pat. No. 7,806,435 B), or a portion integrated with a housing (a closure shell 13) including a cylindrical portion 13b and an inward flange 13c in FIG. 1 of JP 5324930 B.

A metal of the metallic igniter retaining member can be any electrically conductive metal, and iron, stainless steel, aluminum, or the like can be used.

As the resin for the resin molded article, a resin used for integrating an igniter and an igniter retaining member in a known igniter assembly and gas generator can be used.

The spark member causes a spark when discharge occurs between the spark member and the electroconductive pin of the igniter.

As the spark member, an electrically conductive metal can be used, and iron, stainless steel, aluminum, or the like can be used. The spark member may have a plate-like shape, a rod-like shape, or the like, and a part of the spark member may be annular. The spark member can be bent one or more times depending on a mounting part of the igniter assembly.

The electrically insulating partition wall (provided with no through hole) is made of an electrically insulating material selected from synthetic resins, ceramics, synthetic rubbers and the like, but excluding those made of glass.

Thermoplastic resins generally used for injection molding, such as polyamide resins, polycarbonate resins, methyl methacrylate resins, polyolefin resins, and the like, can be used as the synthetic resins.

Aliphatic resins containing no plasticizer (or containing only a small amount of plasticizer), alicyclic epoxy resins such as 3',4'-epoxycyclohexylmethyl-3,4-epoxycyclohexane carboxylate, 1,2-epoxy-4-vinyl cyclohexane, or cycloolefin copolymers, phenol resins, urea resins, melamine resins, unsaturated polyester resins, epoxy resins other than alicyclic epoxy resins, silicone resins and the like can be used as the thermosetting resins. In the following description, "epoxy resins" are inclusive of alicyclic epoxy resins and other epoxy resins.

Known ceramics such as aluminum silicate, alumina, zirconia, titania and the like can be used as the ceramics.

Butyl rubber or silicone rubber can be used as the rubber.

The thickness of the electrically insulating partition wall is in the range of 0.1 mm to 1 mm, preferably in the range of 0.3 mm to 0.8 mm.

In the igniter assembly of the present invention, since the thickness of the electrically insulating partition wall is set within a predetermined range, a spark and discharge occur between the electroconductive pin and the spark member at a predetermined voltage. Thereby, a stable discharge function with good reproducibility is obtained.

The igniter assembly of the second aspect differs from the igniter assembly of the first aspect in that an electrically insulating partition wall is different from the electrically insulating partition wall used in the first aspect.

The electrically insulating partition wall used in the igniter assembly of the second aspect has a through hole penetrating in a thickness direction. A single or a plurality of through holes are formed.

In the case of the single through hole, the through hole and the second end of the spark member are arranged to face each other. The single through hole may be a slit-like hole other than a circular hole.

In the case of the plurality of the through holes, any one through hole or a plurality of through holes are arranged to face the second end of the spark member. The electrically insulating partition wall provided with the plurality of through holes may be formed to have a large number of through holes such as a perforated plate and a lattice.

A ratio (%) of an area of the through holes in a surface of the electrically insulating partition wall provided with the through holes (a surface formed with through holes) is preferably 40% to 80%, and more preferably 50% to 70%. The ratio of the area of the through holes within the above range is preferred because sparking is likely to occur while a strength of the electrically insulating partition wall is maintained.

The thickness of the electrically insulating partition wall provided with a through hole is 0.1 mm to 2 mm, preferably 0.1 mm to 1.5 mm, and more preferably 0.1 mm to 1 mm. Since the dielectric breakdown resistance value of air is lower than that of resin or the like, the thickness of the electrically insulating partition wall provided with a through hole can be larger than that in the case of forming the electrically insulating partition wall with a resin or the like.

Accordingly, where the electrically insulating partition wall is formed with a large number of through holes like a perforated plate or a lattice, a spark is easier induced and a discharge is more likely to occur even though the thickness is the same. Therefore, a discharge is induced at a lower voltage than the electrically insulating partition wall having the same thickness and no through hole.

In a preferred aspect (the third aspect) of the igniter assembly of the present invention, the electrically insulating partition wall is a member separate from the resin molded article, in a shape selected from a cylindrical shape, a semi-cylindrical shape and a flat plate shape, the cylindrical electrically insulating partition wall is disposed between a root portion of the electroconductive pin which is in contact with the resin molded article, and the second end of the spark member to surround the root portion, and the semi-cylindrical electrically insulating partition wall or the flat plate-shaped electrically insulating partition wall is disposed between the root portion of the electroconductive pin, which is in contact with the resin molded article, and the second end of the spark member.

The electrically insulating partition wall is formed of a member separate from the resin molded article and has a shape selected from a cylindrical shape, a semi-cylindrical shape and a flat plate shape.

The cylindrical electrically insulating partition wall surrounds the root portion of the electroconductive pin, which is in contact with the resin molded article, and is disposed between the root portion and the second end of the spark member.

The semi-cylindrical electrically insulating partition wall or the flat plate-shaped electrically insulating partition wall is disposed between the root portion of the electroconductive pin, which is in contact with the resin molded article, and the second end of the spark member. The flat plate-shaped electrically insulating partition wall can be wound around the root portion of the electroconductive pin.

The electrically insulating partition wall and the electroconductive pin are in contact with each other.

In a preferred aspect (the fourth aspect) of the igniter assembly of the present invention, the electrically insulating partition wall is partially embedded in the resin molded article and the remaining portion thereof protrudes into the connector insertion space.

As a result of embedding a part of the electrically insulating partition wall in the resin molded article, the electrically insulating partition wall is fixed to the resin molded article.

In a further preferred aspect of the igniter assembly of the present invention, the electrically insulating partition wall is a part of the resin molded article in a shape selected from a cylindrical shape, a semi-cylindrical shape, and a flat plate shape, the cylindrical electrically insulating partition wall is disposed between the root portion of the electroconductive pin, which is in contact with the resin molded article, and the second end of the spark member to surround the root portion, and the semi-cylindrical electrically insulating partition wall or the flat plate-shaped electrically insulating partition wall is disposed between the root portion of the electroconductive pin, which is in contact with the resin molded article, and the second end of the spark member.

The electrically insulating partition wall in this aspect is formed of a part of the resin molded article and by causing the part of the resin molded article to protrude into the connector insertion space, the protruding part serves as the electrically insulating partition wall. In such an aspect, when the igniter retaining member and the igniter are integrated by injection molding of a resin (a resin to form the resin molded article), a protruding portion to form the electrically insulating partition wall is formed in a predetermined portion.

In a further preferred aspect of the igniter assembly of the present invention, at least a part of the spark member between the first end and the second end is embedded in the resin molded article.

When at least the part of the spark member between the first end and the second end is thus embedded in the resin molded article, the spark member is prevented from displacing or falling off even after a long period of time.

In a further preferred aspect of the igniter assembly of the present invention, the metallic igniter retaining member has an outer annular surface, a cylindrical wall provided vertically from the hole of the outer annular surface, and an inner annular surface extending radially inward from the cylindrical wall, and an inner surface of the cylindrical wall and a circumferential edge of a hole in the inner annular surface are in contact with the resin molded article.

The igniter retaining member in this aspect is similar to the portion integrated with the housing (the closure shell 13) including the cylindrical portion 13*b* and the inward flange 13*c* in FIG. 1 of JP 5324930 B.

The outer annular surface may have an outer cylindrical wall extending in the same direction as the cylindrical wall at the outer circumferential edge.

In a further preferred aspect of the igniter assembly of the present invention, the spark member is integrally formed with the metallic igniter retaining member.

By forming the spark member integrally with the metallic igniter retaining member, it is possible to completely prevent the spark member from displacing or falling off.

The method of manufacturing the igniter assembly of the third aspect described above includes a step of injection-molding a resin to form the resin molding article in the state that the igniter, the metallic igniter retaining member and a member formed of a resin to serve as an electrically insulating partition wall in a shape selected from a cylindrical shape, a semi-cylindrical shape and a flat plate shape are disposed in a mold.

This is the manufacturing method employing an injection molding method by using a separate member to serve as an electrically insulating partition wall. The separate member to serve as an electrically insulating partition wall is disposed in the mold to be located between the root portion of the electroconductive pin, which is in contact with the resin molded article, and the second end of the spark member. When the electrically insulating partition wall has a cylindrical shape, the separate member is fitted onto the electroconductive pin in advance and then disposed in the mold.

The method of manufacturing the igniter assembly of the fourth aspect described above includes a step of injection-molding a resin to form the resin molding article in the state that the igniter, the metallic igniter retaining member and a member formed of a resin to serve as an electrically insulating partition wall selected from a cylindrical member, a semi-cylindrical member and a flat plate-shaped member are disposed in a mold, when the member selected from the cylindrical member, the semi-cylindrical member and the flat plate-shaped member is disposed in the mold, the member being disposed such that a part of the member is to be embedded in the resin molded article, and the remaining part thereof is to be located between the root portion of the electroconductive pin, which is in contact with the resin molded article, and the second end of the spark member.

This is the manufacturing method employing an injection molding method by using a separate member to serve as an electrically insulating partition wall.

The separate member to serve as an electrically insulating partition wall is disposed such that, after the resin is injected, a part of the separate member (for example, a portion in 30% to 70% of the length) is embedded in the resin molded article, and the remaining part thereof (for example, a portion in 70% to 30% of the length) is located between the root portion of the electroconductive pin, which is in contact with the resin molded article, and the second end of the spark member. Such a method is preferable because the separate member to serve as an electrically insulating partition wall is fixed accurately in a prescribed position.

The igniter assembly of the present invention is usable for a gas generator used in an airbag apparatus or the like including the igniter assembly.

Embodiments of the Invention (1) Igniter Assembly Shown in FIGS. 1 and 2

In an igniter assembly 1, an igniter 10 and a metallic igniter retaining member 20 are integrated with a resin molded article 30 interposed therebetween. The igniter 10 is the same as one used in a known igniter assembly or a gas generator, which includes an ignition portion 11 and two electroconductive pins 12 (electroconductive pins 12*a* and 12*b*).

The metallic igniter retaining member 20 is for retaining the igniter 10 through the resin molded article 30, and a shape and a structure thereof are not particularly limited. A metal thereof is an electroconductive metal, and iron, stainless steel, aluminum, or the like can be used.

The igniter retaining member 20 shown in FIG. 1 includes an outer annular surface 21, a cylindrical wall 22 provided vertically from a hole at the center portion thereof, and an inner annular surface 23 extending radially inward from the cylindrical wall 22. In the embodiment shown in FIG. 1, an outer cylindrical wall 24 is further formed in the same direction as the cylindrical wall 22, from an outer circumferential edge of the outer annular surface 21. An inner hole 25 of the inner annular surface 23 is an insertion hole for the electroconductive pins 12 of the igniter 10.

The resin molded article 30 is made of epoxy resin, integrates the igniter 10 and the igniter retaining member 20 and forms a connector insertion space 31. A connector for supplying an ignition current to the electroconductive pins 12 is inserted into the connector insertion space 31.

The ignition portion 11 of the igniter 10 is embedded in the resin molded article 30, except for a part including a discharge surface 11*a* for discharging flame and the like.

In the electroconductive pins 12, a part thereof on the ignition portion 11 side is embedded in the resin molded article 30 and the remaining part on the opposite side protrudes from the resin molded article 30 and is located in the connector insertion space 31.

The connector insertion space 31 has a top surface 32, a circumferential wall surface 33 and an insertion opening 34 for inserting a connector.

The circumferential wall surface 33 may be provided with a recess or a protrusion corresponding to a protrusion or a recess formed on the connector for preventing falling off.

In the igniter retaining member 20 and the resin molded article 30, a part of the igniter retaining member 20 including an inner surface of the cylindrical wall 22 and an inner circumferential edge of the hole 25 in the inner annular surface 23 is in contact with the resin molded article 30.

The igniter assembly 1 further has a plate-shaped spark member 40 folded three times (bent at three spots). In the spark member 40, a first end 41 is connected to the metallic igniter retaining member 20, and a second end 42 opposite to the first end 41 is located inside the connector insertion space 31.

In the embodiment shown in FIG. 1, the first end 41 of the spark member 40 is welded and fixed to the igniter retaining member 20. Alternatively, in the assembling process of the igniter assembly 1, the first end 41 can be strongly abutted against the cylindrical wall 22 by an injection pressure of the resin. A portion extending from the first end 41 of the spark member 40 is embedded in the resin molded article 30, and a portion continuous therefrom to the second end 42 is disposed along the circumferential wall surface 33 and the top surface 32 of the connector insertion space 31.

A cylindrical electrically insulating partition wall 50, which has a thickness in the range of 0.1 mm to 1 mm, is interposed between the second end 42 of the spark member 40 and a root portion of the electroconductive pin 12*a* which is in contact with the top surface 32 of the connector insertion space 31.

FIG. 3 shows, in (a) to (f), different embodiments of the electrically insulating partition wall 50.

An electrically insulating partition wall 50 shown in (a) in FIG. 3 is the cylindrical electrically insulating partition wall 50 used in FIG. 1, and the thickness (interval) d1 thereof is in the range of 0.1 mm to 1 mm. As shown in FIGS. 1 and 2, a part (a part on the first end 51 side) of the cylindrical electrically insulating partition wall 50 is embedded in the resin molded article 30, with the electroconductive pin 12*a* inserted through the cylindrical electrically insulating partition wall 50. The remaining part (a part on the second end 52 side) of the cylindrical electrically insulating partition wall 50 protrudes into the connector insertion space 31. Thereby, the root portion of the electroconductive pin 12*a* which is in contact with the top surface 32 of the connector insertion space 31 is covered by the cylindrical electrically insulating partition wall 50.

Since the second end 42 of the spark member 40 abuts against the cylindrical electrically insulating partition wall 50 in front thereof, an interval d corresponding to the thickness of the cylindrical electrically insulating partition wall 50 is secured between the second end 42 of the spark member 40 and the electroconductive pin 12*a*.

An electrically insulating partition wall 50A shown in (b) in FIG. 3 has a semi-cylindrical shape, and a thickness (interval) d1 is in the range of 0.1 mm to 1 mm. The semi-cylindrical electrically insulating partition wall 50A is disposed between the electroconductive pin 12*a* and the second end 42 of the spark member 40.

An electrically insulating partition wall 50B shown in (c) in FIG. 3 has a flat plate shape, and a thickness (interval) d1 is in the range of 0.1 mm to 1 mm. The electrically insulating partition wall 50B having the flat plate shape is disposed between the electroconductive pin 12*a* and the second end 42 of the spark member 40.

An electrically insulating partition wall 50C shown in (d) in FIG. 3 is the cylindrical electrically insulating partition wall 50 shown in (a) in FIG. 3 in which a large number of through holes 53 are formed in the thickness direction and d2 is in the range of 0.1 mm to 2 mm.

A ratio (%) of the total opening area of the through holes 53 in an area of a surface formed with the through holes 53 is about 65%. In the electrically insulating partition wall 50C shown in (d) in FIG. 3, the through holes 53 are formed to be dispersed over the entire surface, but functionally the same result is obtained even when the through holes 53 are formed only in a surface on the side facing the second end 42 of the spark member 40. In this case, the ratio (%) of the total opening area of the through holes 53 is a half of the above.

An electrically insulating partition wall 50D shown in (e) in FIG. 3 is the semi-cylindrical electrically insulating partition wall 50A shown in (b) in FIG. 3 in which a large number of through holes 53 are formed in the thickness direction and d2 is in the range of 0.1 mm to 2 mm.

A ratio (%) of the total opening area of the through holes 53 in an area of a surface formed with the through holes 53 is about 65%.

An electrically insulating partition wall 50E shown in (f) in FIG. 3 is the flat plate-shaped electrically insulating partition wall 50B shown in (c) in FIG. 3 in which a large number of through holes 53 are formed in the thickness direction and d2 is in the range of 0.1 mm to 2 mm.

A ratio (%) of the total opening area of the through holes 53 in an area of a surface formed with the through holes 53 is about 65%.

A method of manufacturing the igniter assembly 1 shown in FIG. 1 will be described hereinbelow.

A cylindrical member ((a) in FIG. 3) to form the electrically insulating partition wall 50 is fitted onto the electroconductive pin 12a of the igniter 10 and placed together with the metallic igniter retaining member 20 in a mold for molding. In this state, the second end 42 of the spark member 40 abuts against the electrically insulating partition wall 50.

Thereafter, when a resin to form the resin molded article 30 is injection-molded, the electrically insulating partition wall 50 on the the first end 51 side is embedded in the resin molded article 30, and the electrically insulating partition wall 50 on the second end 52 side is located between the root portion of the electroconductive pin 12a, which is in contact with the resin molded article 30, and the second end 42 of the spark member 40. Thereby, the gap d is maintained between the second end 42 of the spark member 40 and the electroconductive pin 12a. The electrically insulating partition wall 50 on the first end 51 side can be melted by the resin in the molten state at the time of the injection molding and integrated with the resin molded article 30.

When a thermosetting resin of a thermal curing type is used as the resin, the resin is then thermally cured.

Thus, the igniter assembly 1 shown in FIG. 1 is manufactured.

When the igniter assembly 1 shown in FIG. 1 or an assembly (for example, a gas generator) which uses the igniter assembly 1, stands in an electrically insulated state from the outside, and charges are accumulated in the outer annular surface due to static electricity or the like, a spark is generated and an electric discharge occurs between the electroconductive pin 12a and the second end 42 of the spark member 40, whereby the voltage is lowered. At this time, since the thickness d of the electrically insulating partition wall 50 is maintained at a predetermined level, the interval d between the electroconductive pin 12a and the second end 42 of the spark member 40 is maintained at a predetermined level. Thereby, a spark is generated and an electric discharge occurs only when a preset voltage is reached. For this reason, a discharge function is stabilized, and the igniter does not malfunction.

(2) Igniter Assembly Shown in FIG. 4

The igniter assembly 1A shown in FIG. 4 is the same as the igniter assembly 1 shown in FIG. 1, except that a shape of a spark member 140 is different and accordingly a contact state between the metallic igniter retaining member 20 and the spark member 140 is different.

In the spark member 140, a first end 141 is connected to the outer annular surface 21 of the metallic igniter retaining member 20, and a second end 142 opposite to the first end 141 is located inside the connector insertion space 31. Further, a part of the spark member leading to the first end 141 abuts against the cylindrical wall 22.

In the embodiment shown in FIG. 4, the first end 141 of the spark member 140 is welded and fixed to the outer annular surface 21, but the first end 141 can strongly abut against the cylindrical wall 22 by the injection pressure of the resin. A portion extending from the first end 141 of the spark member 140 is embedded in the resin molded article 30, and a portion continuous therefrom to the second end 142 is disposed along the circumferential wall surface 33 and the top surface 32 of the connector insertion space 31.

The cylindrical electrically insulating partition wall 50 having the thickness in the range of 0.1 mm to 1 mm is interposed between the second end 142 of the spark member 140 and the root portion of the electroconductive pin 12a which is in contact with the top surface 32 of the connector insertion space 31. The second end 142 of the spark member 140 abuts against the cylindrical electrically insulating partition wall 50.

The igniter assembly 1A shown in FIG. 4 operates similarly to the igniter assembly 1 shown in FIG. 1.

(3) Igniter Assembly Shown in FIG. 5

The igniter assembly 1B shown in FIG. 5 is the same as the igniter assembly 1 shown in FIG. 1, except that a shape of a spark member 240 is different and accordingly a contact state between the metallic igniter retaining member 20 and the spark member 240, and a contact state between the resin molded article 30 and the spark member 240 are different.

A first end 241 of the spark member 240 has a plate shape, and a second end 242 is annular. The first end 241 of the spark member 240 is connected to the outer annular surface 21 of the metallic igniter retaining member 20, and the annular second end 242 opposite to the first end 241 is located inside the connector insertion space 31.

In the embodiment shown in FIG. 5, the plate-shaped first end 241 of the spark member 240 is welded and fixed to the outer annular surface 21. A portion extending from the first end 241 of the spark member 240 is embedded in the resin molded article 30, and the annular second end 242 continuous therefrom and a protruding portion 242a are disposed along the circumferential wall surface 33 and the top surface 32 of the connector insertion space 31.

The cylindrical electrically insulating partition wall 50 which has the thickness in the range of 0.1 mm to 1 mm is interposed between the protruding portion 242a which protrudes from an inner circumferential edge of the hole of the annular second end 242 of the spark member 240, and the root portion of the electroconductive pin 12a which is in contact with the top surface 32 of the connector insertion space 31, so that the gap d is maintained. The annular second end 242 (the protruding portion 242a) of the spark member 240 abuts against the cylindrical electrically insulating partition wall 50.

The igniter assembly 1B shown in FIG. 5 operates similarly to the igniter assembly 1 shown in FIG. 1.

(4) Igniter Assembly Shown in FIG. 6

The igniter assembly 1C shown in FIG. 6 is the same as the igniter assembly 1 shown in FIG. 1, except that a shape of a spark member 340 is different and accordingly a contact state between the metallic igniter retaining member 20 and the spark member 340 is different.

The spark member 340 is integrally formed with the metallic igniter retaining member 20 and is a portion extended in a plate shape from the inner annular surface 23 of the igniter retaining member 20.

An open end 342 of the spark member 340 is located inside the connector insertion space 31, and the cylindrical electrically insulating partition wall 50 having the thickness in the range of 0.1 mm to 1 mm is interposed between the open end 342 and the root portion of the electroconductive pin 12a which is in contact with the top surface 32 of the connector insertion space 31. The open end 342 of the spark member 340 abuts against the cylindrical electrically insulating partition wall 50.

The igniter assembly 1C shown in FIG. 6 operates similarly to the igniter assembly 1 shown in FIG. 1.

(5) Igniter Assembly Shown in FIG. 7

The igniter assembly 1D shown in FIG. 7 is the same as the igniter assembly 1 shown in FIG. 1, except that a shape of a spark member 440 is different and accordingly a contact state thereof with the cylindrical electrically insulating partition wall 50 is different.

In the spark member 440, a first end 441 is connected to the outer annular surface 21 of the metallic igniter retaining member 20, and a second end 442 opposite to the first end 441 is located inside the connector insertion space 31.

In the embodiment shown in FIG. 7, the first end 441 of the spark member 440 is welded and fixed to the outer annular surface 21, but the first end 441 can strongly abut against the cylindrical wall 22 by the injection pressure of the resin. A portion extending from the first end 441 of the spark member 440 is embedded in the resin molded article 30, and a portion continuous therefrom to the second end 442 is disposed along the circumferential wall surface 33 and the top surface 32 of the connector insertion space 31.

The second end 442 of the spark member 440 has a curved surface matching the shape of the cylindrical electrically insulating partition wall 50. The cylindrical electrically insulating partition wall 50 having the thickness in the range of 0.1 mm to 1 mm is interposed between the second end 442 of the spark member 440 having the curved surface and the root portion of the electroconductive pin 12a which is in contact with the top surface 32 of the connector insertion space 31. The second end 442 of the spark member 440 having the curved surface abuts against the cylindrical electrically insulating partition wall 50.

The igniter assembly 1D shown in FIG. 7 operates similarly to the igniter assembly 1 shown in FIG. 1.

(6) Igniter Assembly Shown in FIG. 8

In an igniter assembly 500 shown in FIG. 8, an igniter 510 and a metallic igniter retaining member 520 are integrated with a resin molded article 530 interposed therebetween.

The igniter 510 has an ignition portion 511 and electroconductive pins 512 (512a and 512b) and is the same as that used in a known igniter assembly and a gas generator.

The igniter retaining member 520 has a substantially cylindrical shape.

A connector insertion space 531 has a top surface 532, a circumferential wall surface 533 and an insertion opening 534 for inserting a connector.

A first end 541 of a plate-shaped spark member 540 is welded and fixed to the igniter retaining member 520, but the first end 541 can strongly abut against the igniter retaining member 520 by the injection pressure of the resin. A part of the spark member 540 on the first end 541 side is embedded in the resin molded article 530, and a portion continuous therefrom to a second end 542 is disposed along the top surface 532 of the connector insertion space 531.

The cylindrical electrically insulating partition wall 50 having the thickness in the range of 0.1 mm to 1 mm is interposed between the second end 542 of the spark member 540 and a root portion of an electroconductive pin 512a which is in contact with the top surface 532 of the connector insertion space 531. The second end 542 of the spark member 540 abuts against the cylindrical electrically insulating partition wall 50.

The igniter assembly 500 shown in FIG. 8 operates similarly to the igniter assembly 1 shown in FIG. 1.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An igniter assembly in which an igniter having an ignition portion and an electroconductive pin, and a metallic igniter retaining member are integrated with a resin molded article interposed therebetween, the igniter assembly, comprising:
   a connector insertion space formed by the resin molded article, the electroconductive pin being protruding from the resin molded article and located in the connector insertion space;
   a spark member including,
      a first end connected to the metallic igniter retaining member, and
      a second end, opposite to the first end, located inside the connector insertion space; and
   an electrically insulating partition wall having a thickness of 0.1 mm to 1 mm, provided with no through hole, and interposed between a root portion of the electroconductive pin, which is in contact with the resin molded article, and the second end of the spark member.

2. An igniter assembly in which an igniter having an ignition portion and an electroconductive pin, and a metallic igniter retaining member are integrated with a resin molded article interposed therebetween, the igniter assembly, comprising:
   a connector insertion space formed by the resin molded article, the electroconductive pin being protruding from the resin molded article and located in the connector insertion space;
   a spark member including,
      a first end connected to the metallic igniter retaining member, and a second end, opposite to the first end, located inside the connector insertion space; and
   an electrically insulating partition wall having a thickness of 0.1 mm to 2 mm, provided with a through hole, and interposed between a root portion of the electroconductive pin, which is in contact with the resin molded article, and the second end of the spark member, and the second end and the through hole facing each other.

3. The igniter assembly according to claim 1, wherein the electrically insulating partition wall is a member separate from the resin molded article, in a shape selected from a cylindrical shape, a semi-cylindrical shape and a flat plate shape,
   the cylindrical electrically insulating partition wall is disposed between a root portion of the electroconductive pin which is in contact with the resin molded article, and the second end of the spark member to surround the root portion, and
   the semi-cylindrical electrically insulating partition wall or the flat plate-shaped electrically insulating partition wall is disposed between the root portion of the electroconductive pin, which is in contact with the resin molded article, and the second end of the spark member.

4. The igniter assembly according to claim 2, wherein the electrically insulating partition wall is a member separate from the resin molded article, in a shape selected from a cylindrical shape, a semi-cylindrical shape and a flat plate shape, the cylindrical electrically insulating partition wall is disposed between a root portion of the electroconductive pin which is in contact with the resin molded article, and the second end of the spark member to surround the root portion, and the semi-cylindrical electrically insulating partition wall or the flat plate-shaped electrically insulating partition wall is disposed between the root portion of the electroconductive pin, which is in contact with the resin molded article, and the second end of the spark member.

5. The igniter assembly according to claim 3, wherein the electrically insulating partition wall is partially embedded in the resin molded article and the remaining portion thereof protrudes into the connector insertion space.

6. The igniter assembly according to claim 4, wherein the electrically insulating partition wall is partially embedded in the resin molded article and the remaining portion thereof protrudes into the connector insertion space.

7. The igniter assembly according to claim 1, wherein the electrically insulating partition wall is a part of the resin molded article in a shape selected from a cylindrical shape, a semi-cylindrical shape, and a flat plate shape, the cylindrical electrically insulating partition wall is disposed between the root portion of the electroconductive pin which is in contact with the resin molded article, and the second end of the spark member to surround the root portion, and the semi-cylindrical electrically insulating partition wall or the flat plate-shaped electrically insulating partition wall is disposed between the root portion of the electroconductive pin, which is in contact with the resin molded article, and the second end of the spark member.

8. The igniter assembly according to claim 2, wherein the electrically insulating partition wall is a part of the resin molded article in a shape selected from a cylindrical shape, a semi-cylindrical shape, and a flat plate shape, the cylindrical electrically insulating partition wall is disposed between the root portion of the electroconductive pin which is in contact with the resin molded article, and the second end of the spark member to surround the root portion, and the semi-cylindrical electrically insulating partition wall or the flat plate-shaped electrically insulating partition wall is disposed between the root portion of the electroconductive pin, which is in contact with the resin molded article, and the second end of the spark member.

9. The igniter assembly according to claim 1, wherein at least a part of the spark member between the first end and the second end is embedded in the resin molded article.

10. The igniter assembly according to claim 2, wherein at least a part of the spark member between the first end and the second end is embedded in the resin molded article.

11. The igniter assembly according to claim 1, wherein the metallic igniter retaining member has an outer annular surface, a cylindrical wall provided vertically from a hole of the outer annular surface, and an inner annular surface extending radially inward from the cylindrical wall, and an inner surface of the cylindrical wall and an inner circumferential edge of a hole in the inner annular surface are in contact with the resin molded article.

12. The igniter assembly according to claim 2, wherein the metallic igniter retaining member has an outer annular surface, a cylindrical wall provided vertically from a hole of the outer annular surface, and an inner annular surface extending radially inward from the cylindrical wall, and an inner surface of the cylindrical wall and an inner circumferential edge of a hole in the inner annular surface are in contact with the resin molded article.

13. The igniter assembly according to claim 1, wherein the spark member is integrally formed with the metallic igniter retaining member.

14. The igniter assembly according to claim 2, wherein the spark member is integrally formed with the metallic igniter retaining member.

15. A method of manufacturing the igniter assembly according to claim 3, comprising a step of injection-molding a resin to form the resin molding article in the state that the igniter, the metallic igniter retaining member and a member formed of a resin to serve as an electrically insulating partition wall in a shape selected from a cylindrical shape, a semi-cylindrical shape and a flat plate shape are disposed in a mold.

16. A method of manufacturing the igniter assembly according to claim 4, comprising a step of injection-molding a resin to form the resin molding article in the state that the igniter, the metallic igniter retaining member and a member formed of a resin to serve as an electrically insulating partition wall in a shape selected from a cylindrical shape, a semi-cylindrical shape and a flat plate shape are disposed in a mold.

17. The method of manufacturing the igniter assembly according to claim 5, comprising a step of injection-molding a resin to form the resin molding article in the state that the igniter, the metallic igniter retaining member and a member formed of a resin to serve as an electrically insulating partition wall selected from a cylindrical member, a semi-cylindrical member and a flat plate-shaped member are disposed in a mold, when the member selected from the cylindrical member, the semi-cylindrical member and the flat plate-shaped member is disposed in the mold, the member being disposed such that a part of the member is to be embedded in the resin molded article, and the remaining part thereof is to be located between the root portion of the electroconductive pin, which is in contact with the resin molded article, and the second end of the spark member.

18. The method of manufacturing the igniter assembly according to claim 6, comprising a step of injection-molding a resin to form the resin molding article in the state that the igniter, the metallic igniter retaining member and a member formed of a resin to serve as an electrically insulating partition wall selected from a cylindrical member, a semi-cylindrical member and a flat plate-shaped member are disposed in a mold, when the member selected from the cylindrical member, the semi-cylindrical member and the flat plate-shaped member is disposed in the mold, the member being disposed such that a part of the member is to be embedded in the resin molded article, and the remaining part thereof is to be located between the root portion of the electroconductive pin, which is in contact with the resin molded article, and the second end of the spark member.

* * * * *